(12) United States Patent
Okada et al.

(10) Patent No.: US 12,153,357 B2
(45) Date of Patent: Nov. 26, 2024

(54) MOLDED PRODUCT

(71) Applicant: CANON KABUSHIKI KAISHA, Tokyo (JP)

(72) Inventors: Kouga Okada, Tokyo (JP); Tomonao Nakayasu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 18/321,591

(22) Filed: May 22, 2023

(65) Prior Publication Data

US 2023/0382597 A1    Nov. 30, 2023

(30) Foreign Application Priority Data

May 31, 2022 (JP) .................. 2022-088834

(51) Int. Cl.
*G03G 15/08* (2006.01)
*B29C 33/00* (2006.01)
*B29C 33/42* (2006.01)
*B29C 45/37* (2006.01)
*B29L 31/00* (2006.01)

(52) U.S. Cl.
CPC ......... *G03G 15/0865* (2013.01); *B29C 33/42* (2013.01); *B29C 45/372* (2013.01); *B29L 2031/7678* (2013.01); *B29L 2031/7739* (2013.01); *G03G 2215/066* (2013.01)

(58) Field of Classification Search
CPC .......... G03G 15/0865; G03G 2215/066; B29C 33/42; B29C 33/424; B29C 37/0053; B29C 37/0057; B29C 39/026; B29C 43/021; B29C 45/263; B29C 45/372; B29C 2043/3634; B29C 2045/14696;
(Continued)

(56) References Cited

U.S. PATENT DOCUMENTS 8,440,287 B2 * 5/2013 Shimizu .............. B60R 13/0256
  296/97.7
9,937,675 B2 * 4/2018 Tsubo .................... B29C 33/56
(Continued)

FOREIGN PATENT DOCUMENTS

JP    2006171219 A    6/2006
JP    2009298093 A    12/2009
(Continued)

*Primary Examiner* — Robert B Beatty
(74) *Attorney, Agent, or Firm* — Canon U.S.A., Inc. IP Division

(57) ABSTRACT

A product includes a first concave portion and a second concave portion on a curved surface and a third concave portion on an opposite side of the second concave portion from the first concave portion. A first direction from a bottommost point of the first concave portion to a midpoint between the first and second opening ends of the first concave portion is different from a third direction from a bottommost point of the third concave portion to a midpoint between the first and second opening ends of the third concave portion. A second direction from a bottommost point of the second concave portion to a midpoint between the first and second opening ends of the second concave portion is a direction between the first and third directions. A reference line passing through the first and second opening ends of the third concave portion is orthogonal to the third direction.

12 Claims, 5 Drawing Sheets

(58) Field of Classification Search
CPC ....... B29L 2031/767; B29L 2031/7678; B29L 2031/7739
USPC ........................................................ 399/262
See application file for complete search history.

(56) References Cited

U.S. PATENT DOCUMENTS

2006/0134381 A1* 6/2006 Homburg ............ B60R 13/0256
  428/141
2015/0301230 A1* 10/2015 Dai ..................... B29C 37/0053
  359/601
2019/0084200 A1* 3/2019 Oikawa ................. B29C 45/372
2019/0389110 A1* 12/2019 Sano ..................... B29C 45/372
2020/0031023 A1* 1/2020 Nagoya ................... B29C 45/26
2020/0391419 A1* 12/2020 Suzuki ................ B29C 45/0001

FOREIGN PATENT DOCUMENTS

| JP | 2011017781 A | 1/2011 |
| JP | 2012093683 A | 5/2012 |

* cited by examiner

MOLDED PRODUCT

BACKGROUND

Field of the Disclosure

The present disclosure relates to a molded product.

Description of the Related Art

To mark a picture or a character on a molded product made from resin, there is a known method of processing the picture or the character on a mold for molding the molded product and transferring the picture or the character thereto by injection molding. Further, to improve visibility of the picture or the character on a molded product, there is a method in which a concavo-convex structure having a light scattering function is provided in a part of a mold for a picture or a character and injection molding is performed, thus achieving improvement of visibility as well as cost reduction. For example, according to Japanese Patent Application Laid-Open No. 2012-93683, a form is discussed in which an irregularity direction of a fine irregularity shape of a light diffusing member is made same as a mold release direction of a mold.

In a case where a front surface of a molded product is curved and a projection direction in which a concavo-convex structure of the molded product projects is set to be the same as a mold release direction, intensity of reflected light that is reflected on a back surface of the molded product and returns to the front surface varies depending on an area of the curved surface through which the reflected light passes, resulting in an uneven view from a user.

SUMMARY

Some embodiments in the present disclosure are directed to improving the uniformity of the intensity of light returning to a front surface of a molded product.

According to an aspect of the present disclosure, a molded product has translucency, and the molded product includes a front surface including at least a curved surface with a curved cross section in a predetermined direction, and a plurality of concave portions in the front surface. The plurality of concave portions includes a first concave portion and a second concave portion provided on the curved surface and a third concave portion on an opposite side of the second concave portion from the first concave portion. Cross sections of the first concave portion, the second concave portion, and the third concave portion along the predetermined direction each are a partially circular shape having a first opening end, a second opening end, and a bottommost point. When a straight line passing through a first opening end and a second opening end of the third concave portion is set to a reference line, an acute angle formed by the reference line with a straight line passing through a first opening end and a second opening end of the first concave portion is set to a first angle, and an acute angle formed by the reference line with a straight line passing through a first opening end and a second opening end of the second concave portion is set to a second angle, the second angle is less than the first angle. A first direction from a bottommost point of the first concave portion to a midpoint between the first opening end and the second opening end of the first concave portion on the straight line is different from a third direction from a bottommost point of the third concave portion to a midpoint between the first opening end and the second opening end of the third concave portion on the reference line. A second direction from a bottommost point of the second concave portion to a midpoint between the first opening end and the second opening end of the second concave portion on the straight line is a direction between the first direction and the third direction. The reference line is orthogonal to the third direction. The front surface includes a flat surface that is continuous with the curved surface, and the third concave portion is located on the flat surface.

According to another aspect of the present disclosure, a molded product that has translucency and has been molded with a movable mold includes a front surface at least including a curved surface with a curved cross section in a predetermined direction and a plurality of concave portions provided on the curved surface. The plurality of concave portions includes a first concave portion and a second concave portion. Cross sections of the first concave portion and the second concave portion along the predetermined direction each are a partially circular shape having a first opening end, a second opening end, and a bottommost point. When a straight line along the predetermined direction perpendicular to a movement direction for the mold is set to a reference line, an angle formed by the reference line with a straight line passing through a first opening end and a second opening end of the first concave portion is set to a first angle, and an angle formed by the reference line with a straight line passing through a first opening end and a second opening end of the second concave portion is set to a second angle, both of the first angle and the second angle are acute angles, and the second angle is less than the first angle. A first direction from a bottommost point of the first concave portion to a midpoint between the first opening end and the second opening end of the first concave portion on the straight line is different from the movement direction. A second direction from a bottommost point of the second concave portion to a midpoint between the first opening end and the second opening end of the second concave portion on the straight line is a direction between the movement direction and the first direction.

Further features of various embodiments will become apparent from the following description of exemplary embodiments with reference to the attached drawings.

DESCRIPTION OF THE EMBODIMENTS

Figure 1A:
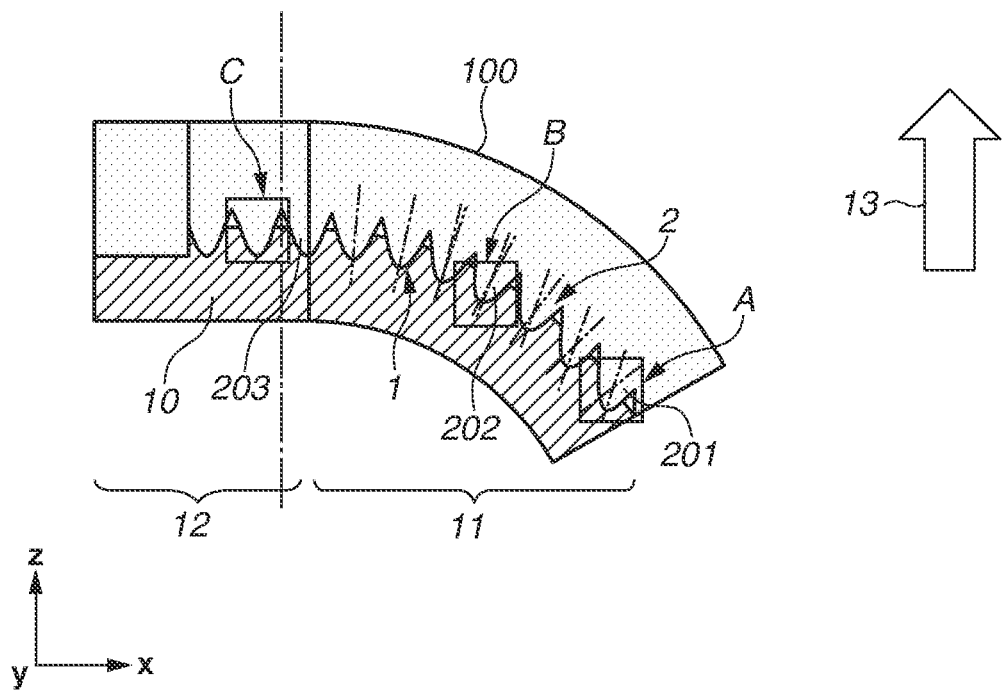
FIG. 1A is a view before releasing a mold from a molded product.

Exemplary embodiments of the present disclosure will be described below with reference to the accompanying drawings. However, the exemplary embodiments described below are an example, and some embodiments are not limited to them. Common configurations will be described while mutually referencing a plurality of drawings, and descriptions of the configurations with common reference numerals are omitted as appropriate. Different items with the same name are distinguished by adding "**-th", such as the first item and the second item.

Figure 1B:
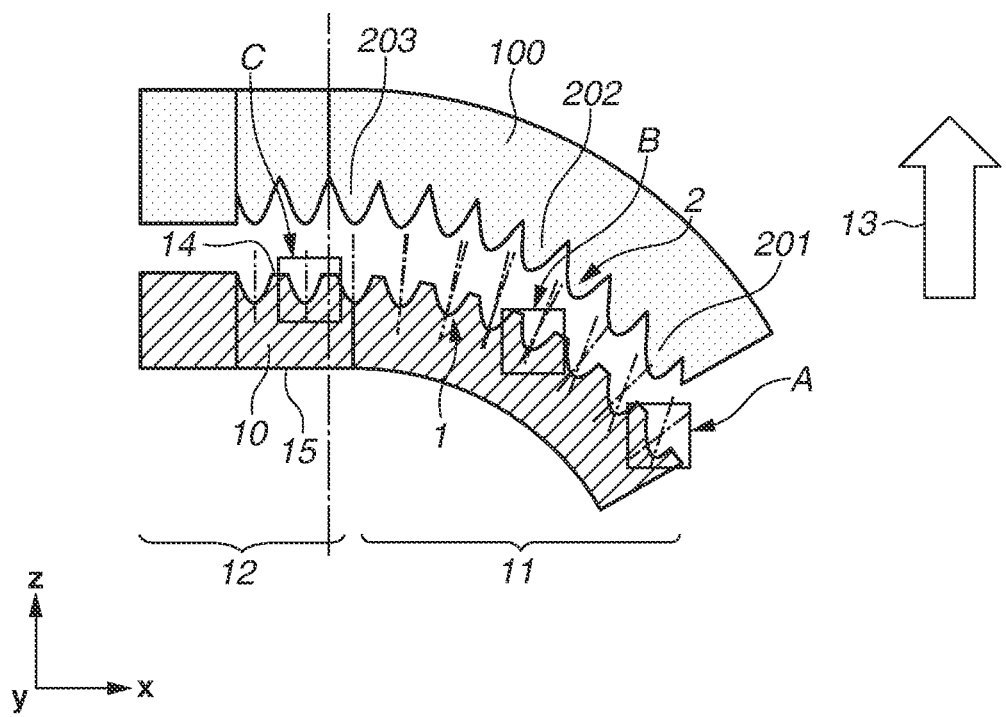
FIG. 1B is a view after releasing the mold from the molded product.
Figure 2A:
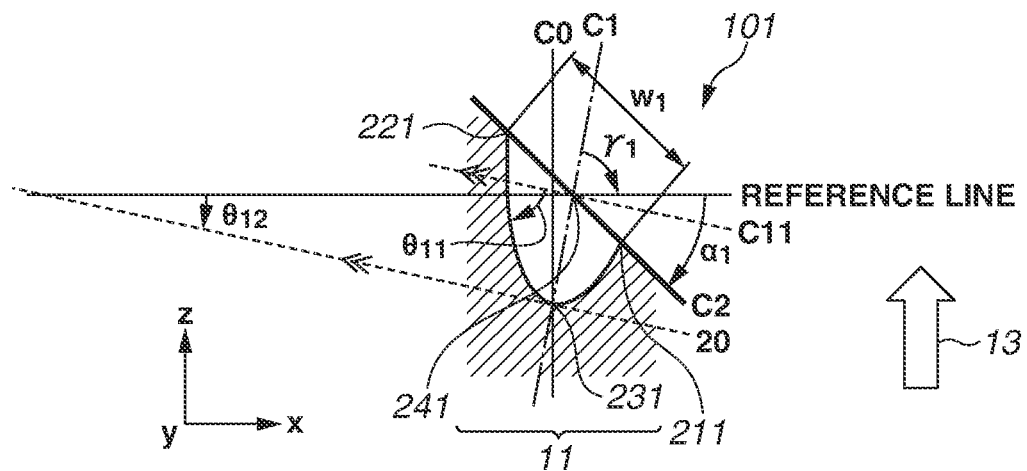
FIGS. 2A, 2B, and 2C are cross-sectional views of concave portions at an end portion of a curved surface, at an intermediate portion of the curved surface, and at a flat surface portion, respectively.
Figure 2B:
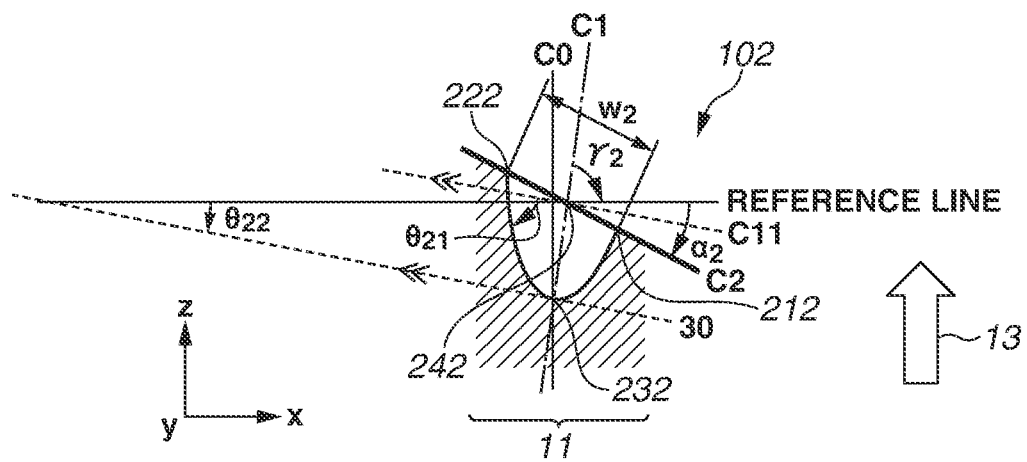
Figure 2C:
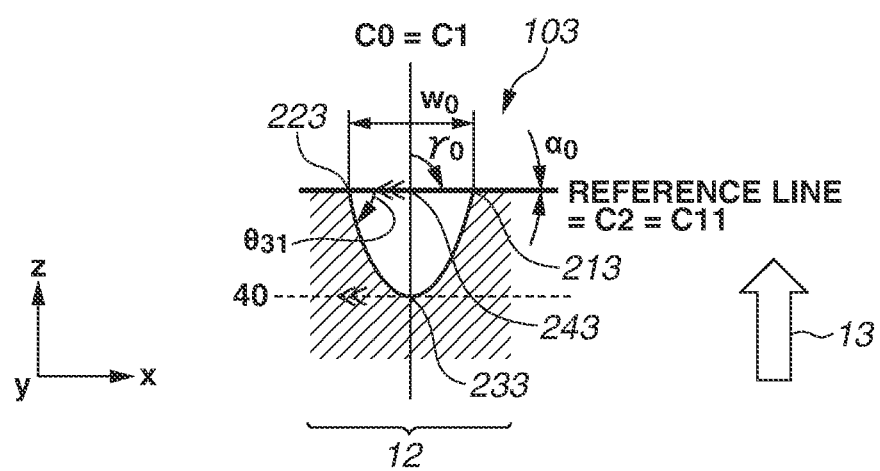

A molded product 10 according to an exemplary embodiment will be described with reference to FIGS. 1A, 1B, and 2A to 2C. FIGS. 1A and 1B are cross-sectional views schematically illustrating the molded product 10 and a mold 100, along a predetermined direction. FIGS. 2A, 2B, and 2C are enlarged views of concave portion shapes in a frame A in FIGS. 1A and 1B, in a frame B in FIG. 1A, and in a frame C in FIG. 1A, respectively. A shape of a concave portion 1 of the molded product 10 illustrated in each of FIGS. 2A to 2C is a result of transfer of a shape of a convex portion 2 of the mold 100, and the shape of the convex portion 2 is an inverted shape of the shape of the concave portion 1.

It is desirable that the molded product 10 has translucency, has a front surface 14 and a back surface 15, and is made from resin, but may further include a metal or a ceramic as long as it is formed from a material including resin. In the present exemplary embodiment, the molded product 10 includes a curved surface portion 11 and a flat surface portion 12 on the front surface 14, and includes a plurality of concave portions 1 having a light scattering function on the front surface 14. It is only required for the molded product 10 according to the present disclosure to include at least the curved surface portion 11 having a curved cross section along the above-described predetermined direction.

The plurality of concave portions 1 includes at least a first concave portion 101 at an end portion of the curved surface portion 11. According to the present exemplary embodiment, the concave portions 1 include a second concave portion 102 arranged in the curved surface portion 11 at a position shifted from the first concave portion 101 toward a third concave portion 103, and the third concave portion 103 is arranged on an opposite side of the second concave portion 102 from the first concave portion 101. According to the present exemplary embodiment, the third concave portion 103 is formed on the flat surface portion 12. Here, the front surface 14 represents a series of surfaces where no concave portions 1 are formed, and in a case where the concave portions 1 are continuous without gaps, a virtual surface including an opening end of each concave portion 1 is regarded as the front surface 14. The opening end herein represents a contact point between the respective concave portion 1 and the front surface 14 viewed in the predetermined direction in a section, and in a case where the concave portions 1 are continuous without gaps, the opening end refers to a contact point between one concave portion and the adjacent concave portion(s).

A surface shape of the movable mold 100 is matched to the molded product 10, a surface of the mold 100 has been subjected to femtosecond laser processing to form a light scattering shape, that is, a plurality of convex portions 2 corresponding to the plurality of concave portions 1 has been formed. The inside of the mold 100 where the plurality of convex portions 2 is formed is filled with resin, and after cooling the filled resin, the mold 100 is released in a mold release direction 13. According to the present exemplary embodiment, the mold release direction 13 for the mold 100 coincides with a Z direction, which is a vertical direction of the flat surface portion 12.

FIG. 2A is a cross-sectional view along the above-described predetermined direction illustrating a shape of the first concave portion 101 corresponding to a first convex portion 201 illustrated in FIGS. 1A and 1B. Similarly, FIGS. 2B and 2C are cross-sectional views along the above-described predetermined direction respectively illustrating a shape of the second concave portion 102 corresponding to a second convex portion 202 and a shape of the third concave portion 103 corresponding to a third convex portion 203. A cross section of each of the plurality of concave portions 1 includes a surface having at least a curved surface with a curved cross section in the predetermined direction. The first concave portion 101 has a partially circular shape including a first opening end 211, a second opening end 221, and a bottommost point 231, and the plurality of concave portions 1 other than the first concave portion 101 also have similar shapes. According to the present exemplary embodiment, a partially circular shape is not limited to a shape in which a part of a perfect circle is missing but also includes an elliptical shape, a parabolic shape, an arcuate shape, and an arch shape. The bottommost point 231 is an intersection point of a virtual line C1 and the first concave portion 101, and is a point at which a tangent line 20 at the bottommost point 231 and a perpendicular line C11 of the virtual line C1 are parallel. The virtual line C1 is shifted by an angle γ from a reference line. The angle γ will be described blow. Similar definitions are applied to the bottommost point and the virtual line for the second concave portion 102 and the third concave portion 103. The second opening end 221 and a second opening end 222 of the first concave portion 101 and second concave portion 102, respectively, are located closer to the flat surface portion 12 than the first opening end 211 and a first opening end 212, respectively. A first opening end 213 of the third concave portion 103 is located closer to the curved surface portion 11 than a second opening end 223 to the curved surface portion 11.

In the first concave portion 101 and the second concave portion 102 illustrated in FIGS. 2A and 2B, virtual lines C0 passing through the respective bottommost points 231 and 232 and extending in the mold release direction 13 pass between the first opening ends 211 and 212 and the second opening ends 221 and 222, respectively. The first opening end 211 is located at an endmost position of the first concave portion 101, and the first opening end 212 is located at an endmost position of the second concave portion 102. Further, the second opening end 221 is located at an endmost position of the first concave portion 101, and the second opening end 222 is located at an endmost position of the second concave portion 102. Thus, the first concave portion 101 and the second concave portion 102 can be shaped so as not to be undercut. The first opening end 211 and the second opening end 221 correspond to end portions of the first convex portion 201, and the bottommost point 231 corresponds to a vertex of the first convex portion 201. The virtual line C0 matches a bottommost point 233, a midpoint 243 between the first opening end 213 and the second opening end 223, and the virtual line C1 in the third concave portion 103.

Next, the angle γ will be described using the first concave portion 101 as an example. The angle γ is a general term for collectively describing angles $\gamma_1$, $\gamma_2$, and $\gamma_0$ in the first to the third concave portions. Initially, a straight line passing through the first opening end 211 and the second opening end 221 is defined as a virtual line C2. A straight line passing through the bottommost point 231 of the first concave portion 101 and a midpoint 241 between the first opening end 211 and the second opening end 221 on the virtual line C2 is defined as the virtual line C1. The angle $\gamma_1$ is an angle between the virtual line C1 and the reference line parallel to the front surface 14 on the flat surface portion 12. In other words, a straight line shifted by the angle $\gamma_1$ from the reference line is the virtual line C1, and the shape of the first concave portion 101 is set based on the virtual line C1. The angle $\gamma_1$ is also an average angle of all tangent lines to the first concave portion 101, and is also an angle at which a laser beam is irradiated at the time of forming the first convex portion 201 on the mold 100. Such a relationship is similar to the angles $\gamma_2$ and $\gamma_0$ respectively in the second concave portion 102 and the third concave portion 103. It is desirable that the angle $\gamma$ is 30 degrees or more and 90 degrees or less, and the angles $\gamma_1$ and $\gamma_2$ in the first concave portion 101 and the second concave portion 102 provided on the curved surface portion 11 are acute angles less than 90 degrees. The angle $\gamma$ is adjustable by changing an irradiation angle of the laser to the mold 100. Meanwhile, the virtual line C2 passing through the first opening end 213 and the second opening end 223 coincides with the reference line in the third concave portion 103 provided on the flat surface portion 12. The angle $\gamma_0$ formed by the reference line with the virtual line C1 is a right angle (90 degrees). Here, the virtual line C2 can be regarded as an inclination of the front surface of the molded product 10 on which each of the concave portions 1 is formed with respect to a plane of the flat surface portion 12 (the reference line in the cross section in the predetermined direction).

Next, an angle $\alpha$ will be described using the first concave portion 101 as an example. The angle $\alpha$ is a general term for collectively describing angles $\alpha_1$, $\alpha_2$, and $\alpha_0$ in the first to the third concave portions. The angle $\alpha_1$ is an inclination angle of the first concave portion 101, and an acute angle formed by the reference line with the virtual line C2 passing through the first opening end 211 and the second opening end 221. This relationship is similar to the angles $\alpha_2$ and $\alpha_0$ respectively in the second concave portion 102 and the third concave portion 103. It can be said that, a concave portion 1 closer to the end portion in the curved surface portion 11 has a greater angle $\alpha$. A width w is a width of the concave portion 1 in the direction of its inclination. Meanwhile, the virtual line C2 coincides with the reference line in the third concave portion 103 provided on the flat surface portion 12, so that the angle $\alpha_0$ is 0 degrees.

Next, the width w will be described using the first concave portion 101 as an example. The width w is a general term for collectively describing widths $w_1$, $w_2$, and $w_0$ in the first to the third concave portions, respectively. The width $w_1$ is a width of the first concave portion 101 in the direction of its inclination. The width $w_1$ can be rephrased as a distance between the first opening end 211 and the second opening end 221 along the virtual line C2. This relationship is similar to the widths $w_2$ and $w_0$ respectively in the second concave portion 102 and the third concave portion 103.

Next, angles $\theta_1$ and $\theta_2$ will be described. Angles $\theta_{11}$, $\theta_{21}$, and $\theta_{31}$ in the first to the third concave portions, respectively, are different from each other, but in a case where these angles are collectively described, they are represented by the angle $\theta_1$. For example, in the first concave portion 101, the angle $\theta_{11}$ is an acute angle between the perpendicular line C11, which passes through the midpoint 241 and is a perpendicular line of the virtual line C1, and a tangent line to a curved surface of the first concave portion 101 at a point at which the perpendicular line C11 intersects. Similar definitions are applies to the angles $\theta_{21}$ and $\theta_{31}$. The angle $\theta_1$ indicates a maximum angle at which the concave portion 1 is releasable from the mold. Meanwhile, angles $\theta_{12}$ and $\theta_{22}$ respectively in the first concave portion 101 and the second concave portion 102 are different angles, but the angle $\theta_2$ is a general term for collectively describing these angles. The angle $\theta_2$ indicates an angle formed by the reference line with the perpendicular line C11. In the third concave portion 103, the reference line and the perpendicular line C11 are parallel, so that an angle formed therebetween is 0 degrees.

In FIG. 2A, the virtual line C2 of the first concave portion 101 is inclined by the angle $\alpha_1$ with respect to the reference line, and the virtual line C1 does not coincide with the virtual line C0. In other words, a depth direction of the first concave portion 101 is not aligned with the mold release direction 13, and is inclined in the same direction as an inclination direction of the front surface 14 with respect to the flat surface portion 12. A similar configuration is applied to the second concave portion 102. In this way, a cross-sectional shape of the concave portion 1 provided on the curved surface portion 11 is formed so that the virtual line C0 does not coincide with the virtual line C1, thus reducing the intensity of light returning to the front surface 14 of the molded product 10.

Figure 3:
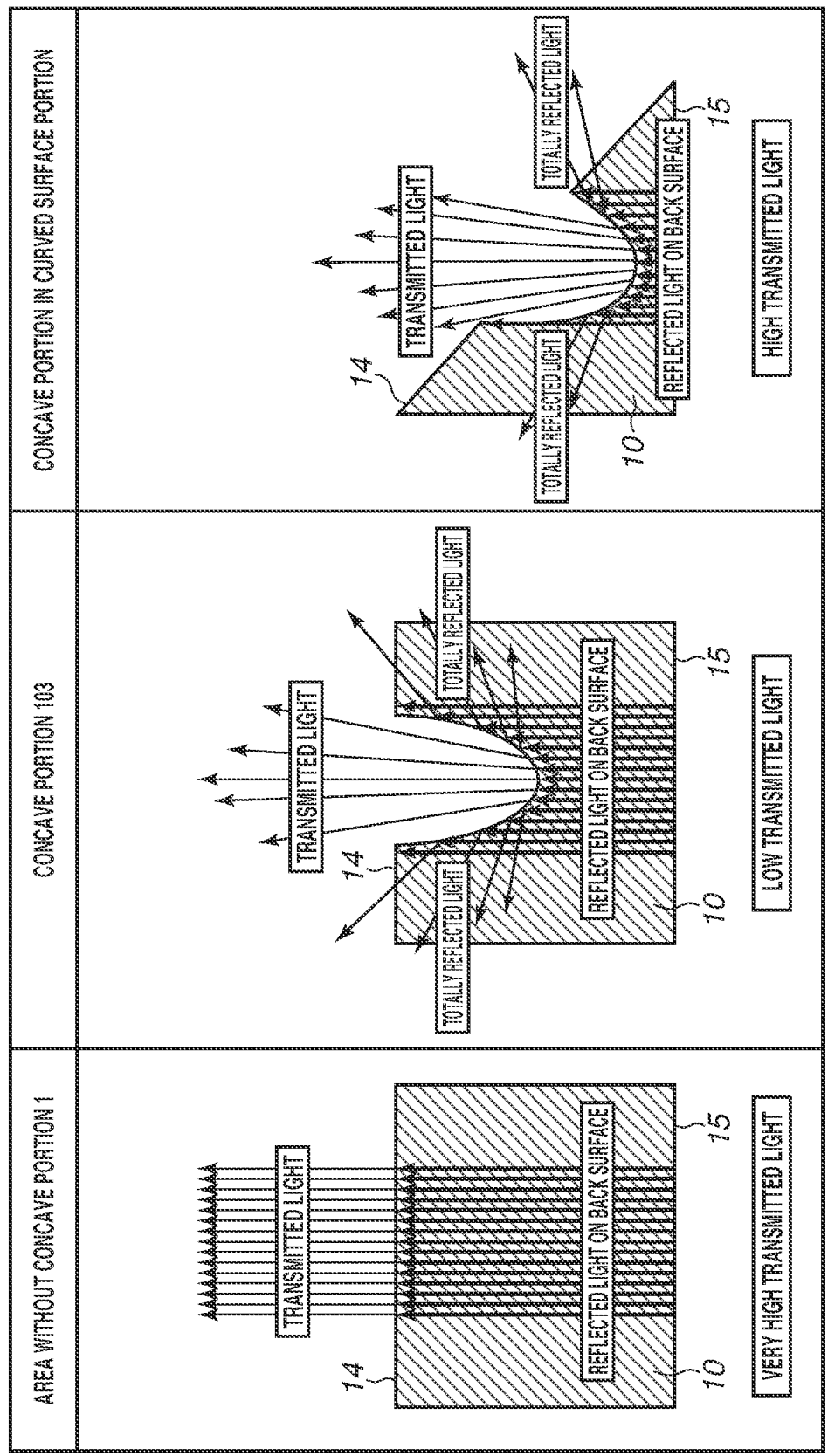
FIG. 3 is a schematic diagram illustrating an issue to be solved in the present disclosure.

A behavior in a case where light is incident on each of three patterns of an area without the concave portion 1, the third concave portion 103, and a conventional concave portion in a curved surface portion is described with reference to FIG. 3. Only reflected light on the back surface 15, which is related to light returning to the front surface 14, is described.

The area without the concave portion 1, which is a first pattern, is initially described. Light entering from the front surface 14 passes through the molded product 10 and is partially reflected on the back surface 15. The reflected light on the back surface 15 is emitted from the front surface 14 to the outside of the molded product 10 as transmitted light. In the first pattern, all the reflected light on the back surface 15 is transmitted through and emitted from the front surface 14 except for internal reflection on the front surface 14, so that the transmitted light is very high in amount, and transparency is high.

The third concave portion 103, which is a second pattern, will now be described. The reflected light on the back surface 15 is divided into light that is totally reflected by the third concave portion 103 and light that is transmitted through the third concave portion 103. Thus, a ratio of the transmitted light decreases, thus reducing the transparency.

The conventional concave portion in the curved surface portion, which is a third pattern, will now be described. As in the case of the second pattern, the reflected light on the back surface 15 is divided into light that is totally reflected by the concave portion and light that is transmitted through the concave portion. However, if the mold release direction 13 is the same as a concavo-convex direction as in the conventional case, the ratio of total reflection decreases, and the ratio of the transmitted light increases. Accordingly, the transparency is higher than that of the second pattern, and the visibility is uneven.

As described in conjunction with the second pattern, for the third concave portion 103 in which the virtual line C0 and the virtual line C2 are orthogonal to each other, total reflectance increases and the intensity of light returning to the front surface 14 can be reduced in a case where the virtual line C0 coincides with the virtual line C1. Thus, according to the present disclosure, a configuration in which the virtual line C0 does not coincide with the virtual line C1 is adopted, thus improving uniformity of the intensity of light returning to the front surface 14 of the third concave portion 103 in which the virtual line C0 coincides with the virtual line C1 and the first concave portion 101 in which the virtual line C0 does not coincide with the virtual line C1.

According to the present exemplary embodiment, both of the first concave portion 101 and the second concave portion 102 in the curved surface portion 11 are configured so that the virtual line C0 does not coincide with the virtual line C1. Further, as described below, the first concave portion 101, provided on the front surface (the virtual line C2) that is more inclined with respect to the reference line, is formed so that the angle between the virtual line C1 and the virtual line C0 is greater than that in the second concave portion 102. This increases the uniformity of the intensity of light returning to the front surface 14 of the first concave portion 101 and the second concave portion 102. These relationships can be rephrased as follows. In FIG. 2A, a direction in which the virtual line C1 extends, that is, a direction from the bottommost point 231 to the midpoint 241, is defined as a first direction. In FIG. 2B, a direction in which the virtual line C1 extends, that is, a direction from a bottommost point 232 to a midpoint 242, is defined as a second direction. Further, in FIG. 2C, a direction in which the virtual line C1 extends, that is, a direction from the bottommost point 233 to the midpoint 243, is defined as a third direction. At this time, the second direction is a direction between the first direction and the third direction. As illustrated in FIG. 2C, the third direction is orthogonal to the reference line and coincides with the mold release direction 13 of the mold 100.

The width $w_1$ of the first concave portion 101 is greater than the width $w_0$ of the third concave portion 103, and the width $w_2$ of the second concave portion 102 has an intermediate size between the width $w_1$ and the width $w_0$. Specifically, it is configured so that the width w increases as the angle $\alpha$ increases. In other words, it is configured so that the width w decreases as a position of the front surface 14 in which the concave portion 1 is provided is closer to the flat surface portion 12 from the curved surface portion 11.

As described above, also in FIG. 2B, the front surface 14, expressed by the virtual line C2 and in which the second concave portion 102 is provided, is inclined by the angle $\alpha_2$, and the virtual line C1 does not coincide with the virtual line C0. The angle $\theta_{22}$ of an acute angle formed by the reference line with a tangent line 30 at the bottommost point 232 of the second concave portion 102 is different from the angle $\theta_{12}$ of an acute angle formed by the reference line with the tangent line 20 at the bottommost point 231 of the first concave portion 101, and the angle $\theta_{12}$ is greater than the angle $\theta_{22}$. In other words, an absolute value of an inclination of the tangent line 20 is greater than an absolute value of an inclination of the tangent line 30. This configuration reduces the intensity of light returning to the front surface 14 even in a case where an incident angle of light is different from the mold release direction 13, thus improving the uniformity of the intensity of light returning to the front surface 14. It is desirable that the angles $\alpha_1$ and $\alpha_2$ are 60 degrees or less.

The virtual line C1 in FIG. 2B is a straight line forming the angle $\gamma_2$ with the reference line. The angle $\gamma_2$ is greater than the angle $\gamma_1$, and conversely, the angle $\alpha_2$ between the reference line and the virtual line C2 is less than the angle $\alpha_1$.

The angle $\theta_{21}$ is equal to the angle $\theta_{11}$ and is also equal to the angle $\theta_{31}$. It is desirable that the angles $\theta_1$, $\theta_{21}$, and $\theta_{31}$ are 60 degrees or more and 80 degrees or less. If the angle $\theta_1$ falls within the above-described range, the concave portion 1 can have a configuration that is not undercut.

As described above, the width w of the concave portion 1 is formed to satisfy a relationship of $w_1 > w_2 > w_0$. Thus, the concave portion 1 has the configuration that is less likely to be undercut. It is desirable that the width $w_0$ is 20 μm or more and 40 μm or less, and the widths $w_1$ and $w_2$ are 20 μm or more and 60 μm or less.

The third concave portion 103 illustrated in FIG. 2C is provided on the flat surface portion 12 of the molded product 10, so that the angle $\alpha_0$ is 0 degrees, and the angle $\gamma_0$ is 90 degrees. The virtual line C0 coincides with the virtual line C1.

A tangent line 40 at the bottommost point 233 of the third concave portion 103 is parallel to the reference line. An acute angle between the tangent line 40 to the third concave portion 103 and the tangent line 20 to the first concave portion 101 is desirably greater than 0 degrees and 60 degrees or less, and more desirably, 20 degrees or more and 40 degrees or less. Further, the angle $\gamma$ is formed to satisfy $\gamma_0 > \gamma_2 > \gamma_1$. It is desirable that a range of the angle $\gamma$ is 70 degrees or more and 90 degrees or less.

As described above, the second direction in which the virtual line C1 extends in the second concave portion 102 is the direction between the first direction in which the virtual line C1 extends in the first concave portion 101 and the third direction in which the virtual line C1 extends in the third concave portion 103. With this configuration, the concave portion 1 can be provided in correspondence with the inclination of the curved surface portion 11, thus realizing the molded product 10 in which the intensity of light returning to the front surface 14 is less likely to vary due to the inclination of the curved surface portion 11.

Not only in the third concave portion 103 formed in the flat surface portion 12, but also in the first concave portion 101 and the second concave portion 102 formed in the curved surface portion 11, the first opening ends 211 and 212 are provided on an opposite side of the second opening ends 221 and 222 from the virtual line C0. Thus, the first concave portion 101 and the second concave portion 102 have the configuration that is not undercut. Further, the virtual line C1 in the concave portion provided on the curved surface is formed so that it does not coincide with the virtual line C0 and the angle with the virtual line C0 increases as the inclination of the surface on which the concave portion is formed, which is represented by the angle $\alpha$, increases, thus improving the uniformity of the intensity of light returning to the front surface 14 in the molded product 10.

The flat surface portion 12 is not necessary, and even in the molded product 10 formed only with the curved surface portion 11, it is possible to provide a concave portion inclined with respect to a concave portion where the virtual line C2 and the virtual line C1 are orthogonal to each other, with the concave portion serving as a reference.

Figure 4:
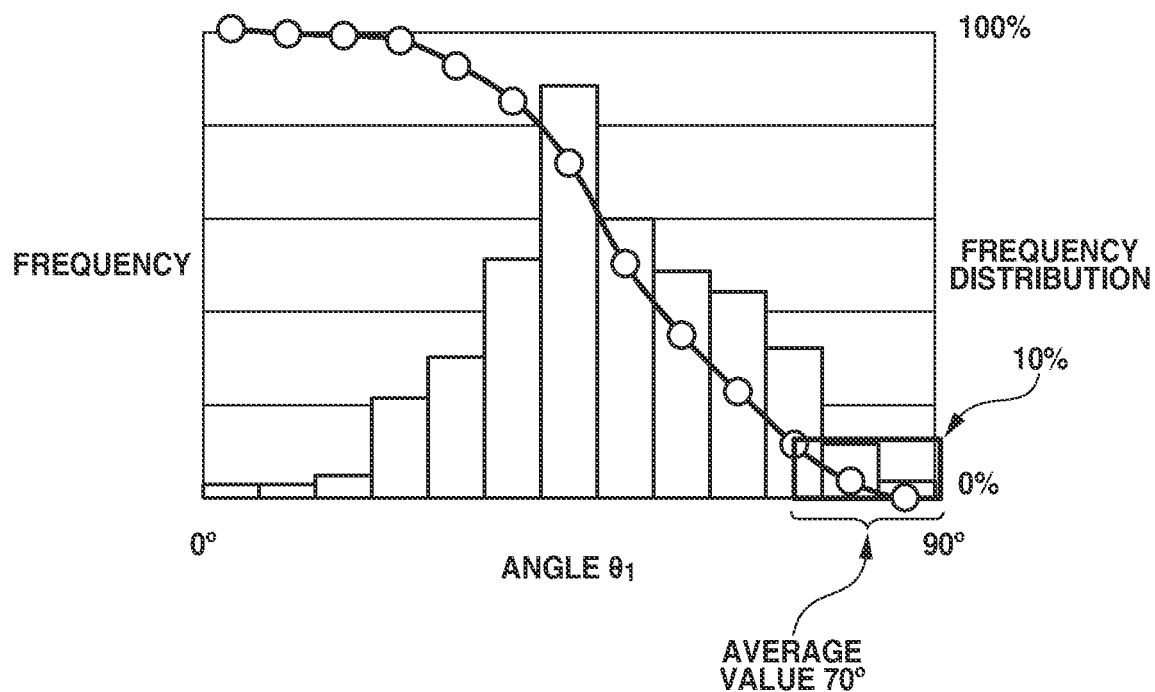
FIG. 4 illustrates frequency distribution for an angle $\theta_1$ illustrated in FIGS. 2A to 2C.

Next, how the angle $\theta_1$ is determined will be described with reference to FIG. 4. FIG. 4 is a graph summarizing a frequency distribution of angles obtained by measuring shapes of the plurality of concave portions 1 using a laser microscope and calculating angles of adjacent points from profiles of the measured data. A bar graph indicates results of measuring the angles of all tangent lines of the plurality of concave portions 1 as a distribution, with a mode near 45 degrees in the center. A line graph indicates accumulation of ratios from an angle of 90 degrees to an angle of 0 degrees. From this graph, the angle $\theta_1$ of the concave portion 1 has an average value of 70 degrees within a range where a ratio of angular distribution frequency is 10% or less.

Next, a reason for calculating the angle $\theta_1$ in this manner will be described. The shape of the concave portion 1 is processed with the femtosecond laser as described above, and includes variations to some extent due to removal processing using the laser beam. Thus, it is desirable to calculate an angle at which the concave portion 1 does not become undercut. However, if the angles of all measured data are targeted, a value close to 90 degrees may be calculated in some cases. According to the present disclosure, in a case where the angle $\theta_1$ is set to a value close to 90 degrees, the average angle of all the concave portions 1 becomes the same as the mold release direction, and the uniformity of the light scattering function is impaired. Thus, the angle $\theta_1$ at which the concave portion 1 does not become undercut can be determined by averaging the angles within the range in which the accumulated value reaches 10% from 90 degrees.

First Example

Figure 5:
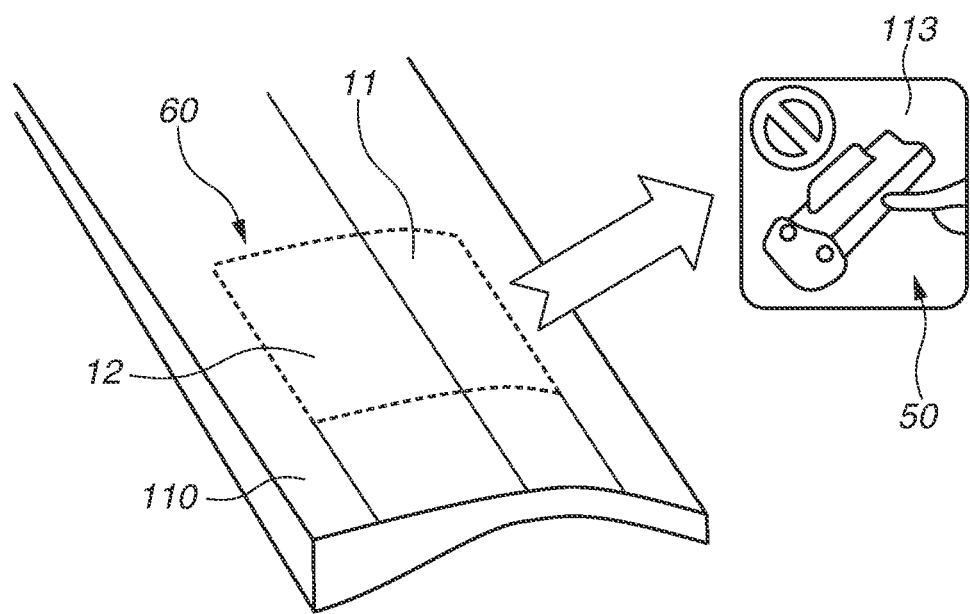
FIG. 5 is a schematic diagram illustrating an example in which the present disclosure is applied to a toner cartridge.

A first example will be described with reference to FIG. 5. FIG. 5 illustrates a molded product 110 serving as a toner cartridge made from resin including the flat surface portion 12 and the curved surface portion 11 continuously connected to the flat surface portion 12, and a picture 113 drawn on the surface thereof to be displayed to a user. An area where the picture 113 is drawn is an area 50 where a plurality of concave portions is formed, and the molded product 110 includes an area 60 that is continuous to the area 50 and is flatter than the area 50. The curved surface portion 11 is a cylindrical side with a radius of 15 mm. Further, a range where the picture 113 covers the curved surface portion 11 is a distance of 6 mm in a direction from the curved surface portion 11 to the flat surface portion 12, and about 24 degrees in an angle, and a range where the picture 113 covers the flat surface portion 12 is 9 mm. Table 1 indicates laser processing conditions for forming the convex portion 2 having the light scattering function on the front surface of the mold 100.

TABLE 1

| Power | 20 W |
|---|---|
| Frequency | 1010 kHz |
| Scan Speed | 1250 mm/s |

Laser processing was performed on a test work in advance to acquire the angle γ of the convex portion 2, and it was determined to change the angle γ from 0 to 10 degrees from the flat surface portion 12 to the curved surface portion 11. A processing program was created in which, while a processing path that matches the picture 113 is being generated through laser processing computer-aided manufacturing (CAM), a laser irradiation direction is changed continuously according to the angle of the curved surface within the range of the angle γ determined as described above. The front surface of the mold 100 was processed under the laser processing conditions in Table 1, based on the created processing program.

Next, injection molding was performed using the mold 100. Table 2 indicates injection molding conditions. At the time of releasing the mold of the injection molding, the molded product 110 was able to be released from the mold 100 without any problems. In addition, the picture 113 on the front surface of the molded product 110 looked uniform without being affected by a base shape of the curved surface portion 11, and it was affirmed that there was no problem in the intensity of the light returning to the front surface 14 of the curved surface portion 11.

TABLE 2

| Mold Temperature | 70° C. |
|---|---|
| Resin temperature | 220° C. |
| Holding pressure | 70 MPa |

A molded product according to the present disclosure is not limited to a toner cartridge according to the present example, and the present disclosure is applicable to a molded product with a curved portion made from resin, such as a film and a polyethylene terephthalate (PET) bottle.

The following indicates some embodiments of the present disclosure.

(Configuration 1) A molded product having translucency, the molded product including a front surface at least including a curved surface with a curved cross section in a predetermined direction, and a plurality of concave portions in the front surface, wherein the plurality of concave portions includes a first concave portion and a second concave portion provided on the curved surface and a third concave portion on an opposite side of the second concave portion from the first concave portion, wherein cross sections of the first concave portion, the second concave portion, and the third concave portion along the predetermined direction each are a partially circular shape having a first opening end, a second opening end, and a bottommost point, wherein, when a straight line passing through a first opening end and a second opening end of the third concave portion is set to a reference line, an acute angle formed by the reference line with a straight line passing through a first opening end and a second opening end of the first concave portion is set to a first angle, and an acute angle formed by the reference line with a straight line passing through a first opening end and a second opening end of the second concave portion is set to a second angle, the second angle is less than the first angle, wherein a first direction from a bottommost point of the first concave portion to a midpoint between the first opening end and the second opening end of the first concave portion on the straight line is different from a third direction from a bottommost point of the third concave portion to a midpoint between the first opening end and the second opening end of the third concave portion on the reference line, wherein a second direction from a bottommost point of the second concave portion to a midpoint between the first opening end and the second opening end of the second concave portion on the straight line is a direction between the first direction and the third direction, wherein the reference line is orthogonal to the third direction, and wherein the front surface includes a flat surface that is continuous with the curved surface, and the third concave portion is located on the flat surface.

(Configuration 2) A molded product that has translucency and has been molded with a movable mold, and the molded product includes a front surface at least including a curved surface with a curved cross section in a predetermined direction, and a plurality of concave portions provided on the curved surface, wherein the plurality of concave portions includes a first concave portion and a second concave portion, wherein cross sections of the first concave portion and the second concave portion along the predetermined direction each are a partially circular shape having a first opening end, a second opening end, and a bottommost point, wherein, when a straight line along the predetermined direction perpendicular to a movement direction for the mold is set to a reference line, an angle formed by the reference line with a straight line passing through a first opening end and a second opening end of the first concave portion is set to a first angle, and an angle formed by the reference line with a straight line passing through a first opening end and a second opening end of the second concave portion is set to a second angle, both of the first angle and the second angle are acute angles, and the second angle is less than the first angle, wherein a first direction from a bottommost point of the first concave portion to a midpoint between the first opening end and the second opening end of the first concave portion on the straight line is different from the movement direction, and wherein a second direction from a bottommost point of the second concave portion to a midpoint between the first opening end and the second opening end of the second concave portion on the straight line is a direction between the movement direction and the first direction.

(Configuration 3) The molded product according to configuration 2, wherein the plurality of concave portions further includes a third concave portion on an opposite side of the second concave portion from the first concave portion, wherein a cross section of the third concave portion along the predetermined direction is a partially circular shape having a first opening end, a second opening end, and a bottommost point, and wherein a third direction from the bottommost point of the third concave portion to a midpoint between the first opening end and the second opening end on a straight line passing through the first opening end and the second opening end of the third concave portion is the same as the movement direction.

(Configuration 4) The molded product according to configuration 1 or 3, wherein the second concave portion is located at a position shifted from the first concave portion toward the third concave portion.

(Configuration 5) The molded product according to any one of configurations 1, 3, and 4, wherein a virtual line passing through the bottommost point of the first concave portion and extending in the third direction passes between the first opening end and the second opening end of the first concave portion.

(Configuration 6) The molded product according to any one of configurations 1 to 5, wherein an acute angle formed by the reference line with a tangent line at the bottommost point of the first concave portion is greater than an acute angle formed by the reference line with a tangent line at the bottommost point of the second concave portion.

(Configuration 7) The molded product according to any one of configurations 1 to 6, wherein an absolute value of an inclination of a tangent line at the bottommost point of the first concave portion with respect to the reference line is greater than an absolute value of an inclination of a tangent line at the bottommost point of the second concave portion with respect to the reference line.

(Configuration 8) The molded product according to any one of configurations 1 to 7, wherein a distance between the first opening end and the second opening end of the first concave portion is greater than a distance from the first opening end to the second opening end of the second concave portion.

(Configuration 9) The molded product according to according to any one of configurations 1, 3, 4, and 5, wherein an acute angle formed by a tangent line at the bottommost point of the first concave portion with a tangent line at the bottommost point of the third concave portion is greater than 0 degrees and 60 degrees or less.

(Configuration 10) The molded product according to any one of configurations 1 to 9, wherein the molded product is made from a material including resin.

(Configuration 11) The molded product according to any one of configurations 1 to 10, wherein the molded product includes a first area having the plurality of concave portions and a second area continuous with the first area and flatter than the first area.

(Configuration 12) The molded product according to any one of configurations 1 to 11, wherein the molded product is a toner cartridge.

The exemplary embodiments described above can be appropriately modified within a range not departing from the technical idea. For example, a plurality of the exemplary embodiments can be combined. Further, a part of items in at least one exemplary embodiment can be deleted or replaced.

Further, a new item can be added to at least one exemplary embodiment. The disclosure of the present specification includes not only what is explicitly described in the present specification, but also all matters that can be understood from the present specification and the drawings attached to the present specification.

Further, the disclosure of the present specification includes complements of the individual concepts described in the present specification. More specifically, if the present specification includes a description to the effect that, for example, "A is greater than B", even if a description to the effect that "A is not greater than B" is omitted, it can be said that the present specification still describes that "A is not greater than B". This is because the description to the effect that "A is greater than B" presupposes consideration of a case "A is not greater than B".

The present disclosure provides a technique that is advantageous for improving uniformity of intensity of light returning to a front surface in a molded product.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-088834, which was filed on May 31, 2022 and which is hereby incorporated by reference herein in its entirety.

What is claimed is:

1. A molded product having translucency, the molded product comprising:
a front surface at least including a curved surface with a curved cross section in a predetermined direction; and
a plurality of concave portions in the front surface,
wherein the plurality of concave portions includes a first concave portion and a second concave portion provided on the curved surface and a third concave portion on an opposite side of the second concave portion from the first concave portion,
wherein cross sections of the first concave portion, the second concave portion, and the third concave portion along the predetermined direction each are a partially circular shape having a first opening end, a second opening end, and a bottommost point,
wherein, when a straight line passing through a first opening end and a second opening end of the third concave portion is set to a reference line, an acute angle formed by the reference line with a straight line passing through a first opening end and a second opening end of the first concave portion is set to a first angle, and an acute angle formed by the reference line with a straight line passing through a first opening end and a second opening end of the second concave portion is set to a second angle, the second angle is less than the first angle, wherein a first direction from a bottommost point of the first concave portion to a midpoint between the first opening end and the second opening end of the first concave portion on the straight line is different from a third direction from a bottommost point of the third concave portion to a midpoint between the first opening end and the second opening end of the third concave portion on the reference line, wherein a second direction from a bottommost point of the second concave portion to a midpoint between the first opening end and the second opening end of the second concave portion on the straight line is a direction between the first direction and the third direction, wherein the reference line is orthogonal to the third direction, and wherein the front surface includes a flat surface that is continuous with the curved surface, and the third concave portion is located on the flat surface.

2. The molded product according to claim 1, wherein the second concave portion is located at a position shifted from the first concave portion toward the third concave portion.

3. The molded product according to claim 1, wherein a virtual line passing through the bottommost point of the first concave portion and extending in the third direction passes between the first opening end and the second opening end of the first concave portion.

4. The molded product according to claim 1, wherein an acute angle formed by the reference line with a tangent line at the bottommost point of the first concave portion is greater than an acute angle formed by the reference line with a tangent line at the bottommost point of the second concave portion.

5. The molded product according to claim 1, wherein an absolute value of an inclination of a tangent line at the bottommost point of the first concave portion with respect to the reference line is greater than an absolute value of an inclination of a tangent line at the bottommost point of the second concave portion with respect to the reference line.

6. The molded product according to claim 1, wherein a distance between the first opening end and the second opening end of the first concave portion is greater than a distance from the first opening end to the second opening end of the second concave portion.

7. The molded product according to claim 1, wherein an acute angle formed by a tangent line at the bottommost point of the first concave portion with a tangent line at the bottommost point of the third concave portion is greater than 0 degrees and is 60 degrees or less.

8. The molded product according to claim 1, wherein the molded product is made from a material including resin.

9. The molded product according to claim 1, wherein the molded product includes a first area having the plurality of concave portions and a second area continuous with the first area and flatter than the first area.

10. The molded product according to claim 1, wherein the molded product is a toner cartridge.

11. A molded product that has translucency and has been molded with a movable mold, the molded product comprising:
a front surface at least including a curved surface with a curved cross section in a predetermined direction; and
a plurality of concave portions provided on the curved surface,
wherein the plurality of concave portions includes a first concave portion and a second concave portion,
wherein cross sections of the first concave portion and the second concave portion along the predetermined direction each are a partially circular shape having a first opening end, a second opening end, and a bottommost point,
wherein, when a straight line along the predetermined direction perpendicular to a movement direction for the mold is set to a reference line, an angle formed by the reference line with a straight line passing through a first opening end and a second opening end of the first concave portion is set to a first angle, and an angle formed by the reference line with a straight line passing through a first opening end and a second opening end of the second concave portion is set to a second angle, both of the first angle and the second angle are acute angles, and the second angle is less than the first angle,
wherein a first direction from a bottommost point of the first concave portion to a midpoint between the first opening end and the second opening end of the first concave portion on the straight line is different from the movement direction, and
wherein a second direction from a bottommost point of the second concave portion to a midpoint between the first opening end and the second opening end of the second concave portion on the straight line is a direction between the movement direction and the first direction.

12. The molded product according to claim 11,
wherein the plurality of concave portions further includes a third concave portion on an opposite side of the second concave portion from the first concave portion,
wherein a cross section of the third concave portion along the predetermined direction is a partially circular shape having a first opening end, a second opening end, and a bottommost point, and
wherein a third direction from the bottommost point of the third concave portion to a midpoint between the first opening end and the second opening end on a straight line passing through the first opening end and the second opening end of the third concave portion is the same as the movement direction.

* * * * *